United States Patent
Hershcovits et al.

(10) Patent No.: US 10,917,500 B2
(45) Date of Patent: Feb. 9, 2021

(54) INFERRING CLIENT-SERVER RELATIONS FOR UDP CONNECTIONS

(71) Applicant: Guardicore Ltd., Tel Aviv (IL)

(72) Inventors: Uri Hershcovits, Herzliya (IL); Liron Schiff, Jerusalem (IL); Itamar Tal, Kadima (IL)

(73) Assignee: GUARDICORE LTD., Tel Aviv (IL)

(*) Notice: Subject to any disclaimer, the term of this patent is extended or adjusted under 35 U.S.C. 154(b) by 22 days.

(21) Appl. No.: 16/449,468

(22) Filed: Jun. 24, 2019

(65) Prior Publication Data
US 2020/0404080 A1 Dec. 24, 2020

(51) Int. Cl.
*H04L 29/06* (2006.01)
*H04L 12/26* (2006.01)
*G06F 9/54* (2006.01)
*H04L 12/851* (2013.01)

(52) U.S. Cl.
CPC .............. *H04L 67/42* (2013.01); *G06F 9/547* (2013.01); *H04L 43/18* (2013.01); *H04L 47/2483* (2013.01); *H04L 69/164* (2013.01); *H04L 43/04* (2013.01)

(58) Field of Classification Search
None
See application file for complete search history.

(56) References Cited

U.S. PATENT DOCUMENTS

| | | | | |
|---|---|---|---|---|
| 2004/0220984 A1* | 11/2004 | Dudfield | ............. | H04L 43/0894 708/200 |
| 2009/0199296 A1* | 8/2009 | Xie | ........................ | G06F 21/316 726/23 |
| 2010/0115617 A1* | 5/2010 | Weber | ................. | H04L 63/1458 726/23 |
| 2010/0138535 A1* | 6/2010 | Jerrim | ................. | H04L 63/1416 709/224 |
| 2014/0157407 A1* | 6/2014 | Krishnan | ................ | G06F 21/50 726/22 |
| 2015/0163117 A1* | 6/2015 | Lambeth | ............... | H04L 43/026 709/224 |
| 2015/0280999 A1* | 10/2015 | Chart | ...................... | H04L 41/04 709/224 |
| 2016/0218973 A1* | 7/2016 | Anand | .................. | H04L 45/745 |
| 2016/0359686 A1* | 12/2016 | Parandehgheibi | .. | G06F 3/04842 |

* cited by examiner

*Primary Examiner* — Joshua Joo
(74) *Attorney, Agent, or Firm* — Kligler & Associates Patent Attorneys Ltd

(57) ABSTRACT

A method for monitoring a computing system including multiple endpoints, includes monitoring, in at least some of the endpoints, operating-system (OS) system calls relating to a transport protocol having no handshake mechanism. First and second endpoints, which exchange a flow of packets with one another using the transport protocol, are identified from among the multiple endpoints. A deduction is made, from the monitored system calls, which of the first and second endpoints acts as a server in the flow of packets, and which of the first and second endpoints acts as a client in the flow of packets.

16 Claims, 5 Drawing Sheets

INFERRING CLIENT-SERVER RELATIONS FOR UDP CONNECTIONS

FIELD OF THE INVENTION

The present invention relates generally to computing-system monitoring, security and management, and particularly to methods and systems for identification of client-server relations in computing systems.

BACKGROUND OF THE INVENTION

Computing-system endpoints, such as servers and Virtual Machines (VMs), use various types of transport protocols for communicating with one another. Some transport protocols, such as the Transmission Control Protocol (TCP), have built-in handshake mechanisms that include packet acknowledgements and retransmissions. Other transport protocols, such as the User Datagram Protocol (UDP), do not include any sort of handshaking.

SUMMARY OF THE INVENTION

An embodiment of the present invention that is described herein provides a method for monitoring a computing system including multiple endpoints. The method includes monitoring, in at least some of the endpoints, operating-system (OS) system calls relating to a transport protocol having no handshake mechanism. First and second endpoints, which exchange a flow of packets with one another using the transport protocol, are identified from among the multiple endpoints. A deduction is made, from the monitored system calls, which of the first and second endpoints acts as a server in the flow of packets, and which of the first and second endpoints acts as a client in the flow of packets.

In some embodiment, the transport protocol is a User Datagram Protocol (UDP). In some embodiments, the method further includes identifying, based on the monitored system calls, at least one process in at least one of the first and second endpoints that is associated with the flow of packets.

In an embodiment, monitoring the OS system calls includes monitoring in the first and second endpoints (i) system calls that create network sockets and (ii) system calls that perform initial communication transactions occurring after the creation of the respective network sockets. Deducing which of the endpoints acts as a server and which of the endpoints acts as a client may include: identifying (i) creation of a network socket for the flow of packets in the first endpoint, and (ii) an initial communication transaction occurring in the first endpoint after the creation of the network socket; if the initial communication transaction is a write transaction, deducing that the first endpoint acts as a client; and if the initial communication transaction is a read transaction, deducing that the first endpoint acts as a server.

In an example embodiment, identifying the first and second endpoints includes identifying a matching flow tuple in the first and second endpoints. In a disclosed embodiment, deducing which of the endpoints acts as a server and which of the endpoints acts as a client includes: if memory addresses, which were allocated from a memory pool in the first endpoint for send operations, are closer to a base address of the memory pool than the memory addresses allocated for receive operations, deducing that the first endpoint acts as a client; and, if the memory addresses, which were allocated for the receive operations, are closer to the base address than the memory addresses allocated for the send operations, deducing that the first endpoint acts as a server.

In another embodiment, deducing which of the endpoints acts as a server and which of the endpoints acts as a client includes deducing that the first endpoint acts as a client in response to assessing that a port assigned to the flow of packets in the first endpoint is an ephemeral port. Additionally or alternatively, deducing which of the endpoints acts as a server and which of the endpoints acts as a client may include deducing that the first endpoint acts as a server in response to assessing that a port assigned to the flow of packets in the first endpoint is also assigned in one or more additional flows of packets.

Further additionally or alternatively, deducing which of the endpoints acts as a server and which of the endpoints acts as a client may include identifying, in at least one of the endpoints, a configuration of a port as a server port. In yet another embodiment, deducing which of the endpoints acts as a server and which of the endpoints acts as a client includes analyzing a temporal pattern of the OS system calls.

There is additionally provided, in accordance with an embodiment of the present invention, an apparatus for monitoring a computing system including multiple endpoints. The apparatus includes an interface and a processor. The interface is configured to receive, from at least some of the endpoints, monitored operating-system (OS) system calls relating to a transport protocol having no handshake mechanism. The processor is configured to identify, from among the multiple endpoints, first and second endpoints that exchange a flow of packets with one another using the transport protocol, and to deduce, from the monitored system calls, which of the first and second endpoints acts as a server in the flow of packets, and which of the first and second endpoints acts as a client in the flow of packets.

The present invention will be more fully understood from the following detailed description of the embodiments thereof, taken together with the drawings in which:

DETAILED DESCRIPTION OF EMBODIMENTS

Overview

Figure 1:
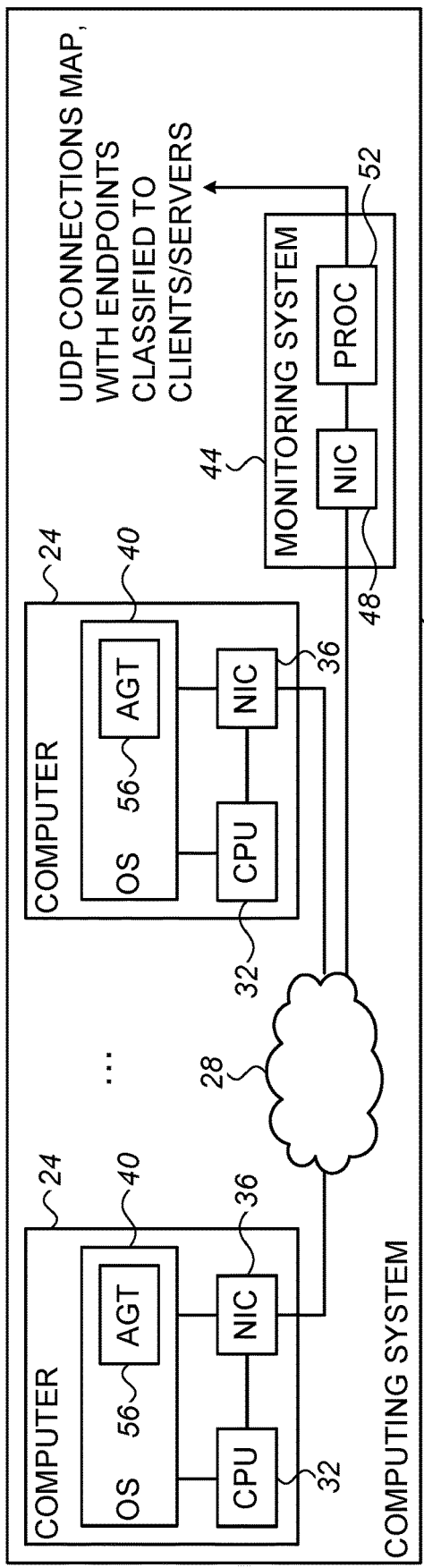
FIG. 1 is a block diagram that schematically illustrates a computing system, in accordance with an embodiment of the present invention.

In various network monitoring applications it is desirable to identify pairs of computing-system endpoints (e.g., computers or VMs) that communicate with one another. For a given flow of packets between a pair of endpoints, it is also valuable to identify which of the endpoints acts as a client (e.g., issues requests for a service) and which of the endpoints acts as a server (e.g., responds to requests).

For endpoints that communicate using a transport protocol that includes handshaking, like TCP, it is relatively straightforward to identify the server and the client based on handshaking packets. When the transport protocol does not include handshaking, however, as in the case of UDP, this task becomes challenging.

Embodiments of the present invention that are described herein provide improved methods and apparatus for computer-system monitoring. In some embodiments, a monitoring system is coupled to a computing system that comprises multiple endpoints. The monitoring system identifies pairs of endpoints that communicate with one another. For a given flow of packets exchanged between a pair of endpoints, the monitoring system identifies which endpoint acts as a server and which endpoint acts as a client. These identifications are performed even though the endpoints communicate using a transport protocol that does not include handshaking, such as UDP.

In some embodiments, monitoring agents ("agents" for brevity) are installed in at least some of the endpoints of the computing system. Each monitoring agent has access to the operating system (OS) of its respective endpoint, and is configured to monitor certain OS system calls ("system calls" for brevity) and report at least some of the monitored system calls to the monitoring system. Based on the system calls reported by the various agents, the monitoring system is configured to identify pairs of endpoints that communicate with one another using UDP, and, for a given pair, which endpoint acts as a server and which endpoint acts as a client.

In some embodiments, each agent monitors two types of system calls in the OS of its endpoint—(i) creation of a new UDP network socket, and (ii) the first usage of a newly-created UDP network socket. For brevity, these two types of system calls are referred to herein as "socket creation" and "first usage," respectively.

When reporting a socket creation or a first usage of a socket, the agent typically reports parameters such as the local endpoint address, the process that created the socket, the local port associated with the socket, the remote endpoint address, and the remote port. When reporting a first usage of a socket, the agent also reports whether the first usage was a read transaction or a write transaction.

In an embodiment, the monitoring system identifies pairs of endpoints that communicate with one another, by correlating reports from different agents. For a given UDP flow between a pair of endpoints, an endpoint in which the first usage of the socket was a write transaction (e.g., "send") is identified as a client. An endpoint in which the first usage of the socket was a read transaction (e.g., "receive") is identified as a server. Based on the parameters included in the agents' reports, the monitoring system is also able to identify the processes that are associated with the UDP flow in question in the two endpoints.

The technique above refers to a scenario in which the monitoring system possesses complete information (regarding socket creation and first usage) from both endpoints of the UDP flow. In some cases, however, only partial information is available to the monitoring system. Such scenarios may occur, for example, when an agent is installed only in one of the endpoints, or when an agent of an endpoint began monitoring after the socket has been created. Variants of the disclosed technique for handling such scenarios are also described.

The outcome of the disclosed techniques can be presented in various ways, e.g., as a list or map of pairs of endpoints that communicate with one another, and with suitable indications that mark the classification of endpoints to servers and clients. Presenting the directions of flows provides better visual representation of the connection graph. This information can be used in various computer-system management applications, e.g., in exploration of connectivity issues, or in detection and protection against security threats, e.g., for blocking and/or alerting flows based on direction.

System Description

FIG. 1 is a block diagram that schematically illustrates a computing system 20, in accordance with an embodiment of the present invention. System 20 may comprise, for example, a data center, a High-Performance Computing (HPC) cluster, or any other suitable type of computing system.

System 20 comprises multiple physical computers, in the present example computers 24. Computers 24 are interconnected by a communication network 28, e.g., a Local-Area Network (LAN). Processes running on different computers 24 may thus communicate with one another via network 28 using UDP. In this context, computers 24 are regarded as endpoints of UDP flows.

In the embodiment of FIG. 1, each computer 24 comprises a Central Processing Unit (CPU) 32, also referred to as a processor, a memory such as Random Access Memory (RAM—not shown), a Network Interface Controller (NIC) 36, and persistent storage (e.g., disk—not shown). CPU 32 of each computer 24 runs an Operating System (OS) 40, for example Linux® or Microsoft Windows®.

In the embodiment of FIG. 1, system 20 further comprises a monitoring system 44. Monitoring system 44 performs tasks such as system management and configuration, and/or detection and protection against security threats. Monitoring system 44 comprises a NIC 48 for connecting to network 28, and a processor 52 that carries out the various tasks of the monitoring system.

Among other tasks, monitoring system 44 identifies pairs of endpoints (computers 24 in this example) that communicate with one another using UDP, and for a given UDP flow, which endpoint acts as a client and which endpoint acts as a server. In the present example, monitoring system 44 outputs a map of UDP flows. For each UDP flow, the map specifies the two endpoints of the flow (in the present example two computers 24), and indicates which endpoint acts as a client and which endpoint acts as a server. Optionally, the map may specify the individual OS processes within the endpoints that are associated with the flow. Any other suitable information may also be output. The information may be presented to a user using any suitable means, e.g., using a Graphical User Interface (GUI). Additionally or alternatively, the information may be output to another system, e.g., to some external security system, over a suitable interface.

In some embodiments, OSs 40 of at least some of computers 24 run respective monitoring agents 56. Processor 52 of monitoring system 44 performs the tasks described herein based on information reported by monitoring agents 56. The operation of agents 56 and monitoring system 44 is explained in detail below.

Figure 2:
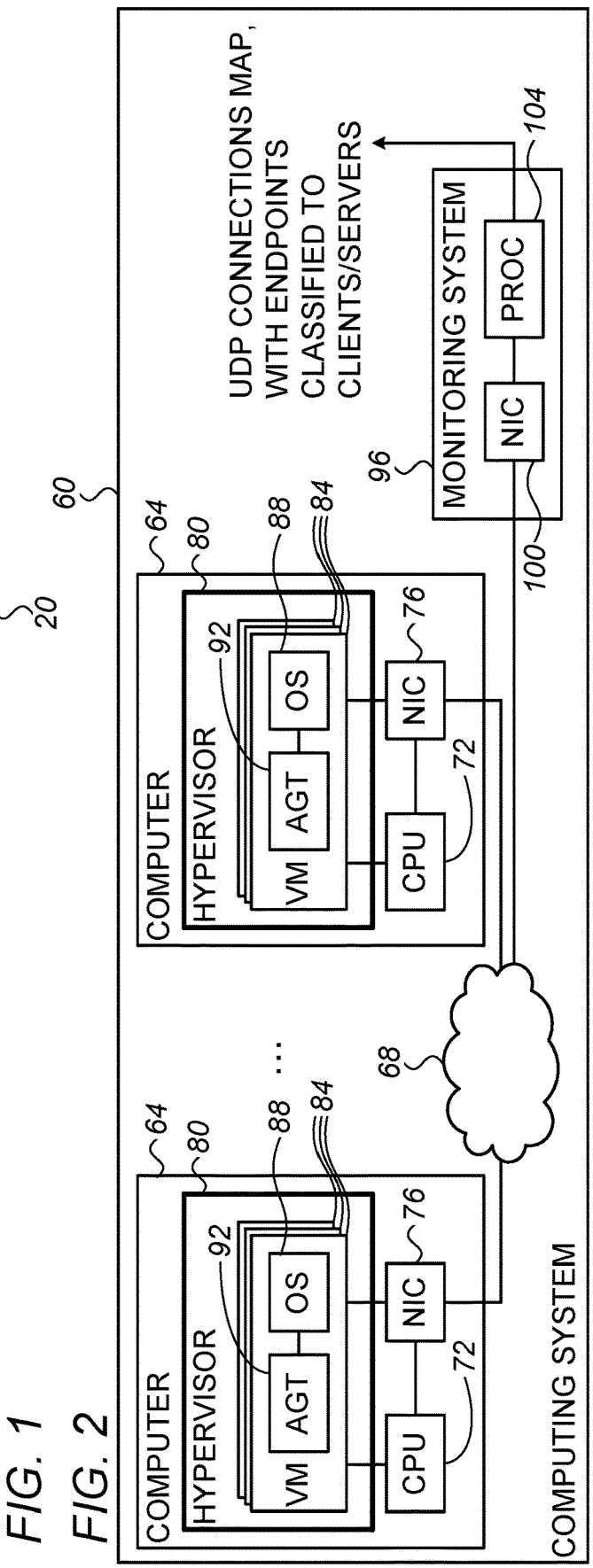
FIG. 2 is a block diagram that schematically illustrates a virtualized computing system, in accordance with another embodiment of the present invention.

FIG. 2 is a block diagram that schematically illustrates a virtualized computing system 60, in accordance with another embodiment of the present invention. Like system 20 of FIG. 1, system 60 may comprise, for example, a data center, a HPC cluster or any other suitable type of computing system.

System 60 comprises multiple physical computers, in the present example computers 64, which are interconnected by a communication network 68, e.g., a LAN. In the embodiment of FIG. 2, each computer 64 comprises a CPU 72, also referred to as a processor, a memory such as RAM (not shown), a NIC 76, and persistent storage (e.g., disk—not shown).

CPU 72 of each computer 64 runs a hypervisor 80 that is configured to host one or more VMs 84. Hypervisor 80 serves as a virtualization layer that allocates physical resources (e.g., CPU, storage, memory and network resources) to the VMs it hosts. Hypervisor 80 may comprise, for example, ESXi, QEMU-KVM, Xen, or any other suitable type of hypervisor. Each VM 84 runs a guest OS 88, for example Linux or Windows. Processes running in different VMs 84 (either on the same computer or on different computers) may thus communicate with one another using UDP. In this context, VMs 84 are regarded as endpoints of UDP flows.

In the embodiment of FIG. 2, system 60 further comprises a monitoring system 96 that performs tasks such as system management and configuration, and/or detection and protection against security threats. Monitoring system 96 comprises a NIC 100 for connecting to network 68, and a processor 104 that carries out the various tasks of the monitoring system.

Similarly to monitoring system 44 of FIG. 1, monitoring system 96 identifies pairs of endpoints (VMs 84 in this example) that communicate with one another using UDP, and for a given UDP flow, which endpoint acts as a client and which endpoint acts as a server. Any of the output types and presentation means, described in the context of monitoring system 44 of FIG. 1, may be output by monitoring system 86.

In some embodiments, guest OSs 88 of at least some of VMs 84 run respective monitoring agents 92. Processor 104 of monitoring system 96 performs the tasks described herein based on information reported by monitoring agents 92. The operation of agents 92 and monitoring system 96 is explained in detail below.

The configurations of computing systems 20 and 60, monitoring systems 44 and 96, and their various components, shown in FIGS. 1 and 2, are example configurations that are depicted purely for the sake of conceptual clarity. In alternative embodiments, any other suitable configurations can be used. For example, the disclosed techniques are in no way limited to UDP, and can be applied to infer client-server relations for any other suitable protocol. As another example, the disclosed techniques can also be applied in hybrid configurations comprising both physical endpoints (e.g., computers 24) and virtual endpoints (e.g., VMs 84).

The different elements shown in FIGS. 1 and 2 may be implemented using software, using suitable hardware, such as one or more Application-Specific Integrated Circuits (ASIC) or Field-Programmable Gate Arrays (FPGA), or using a combination of hardware and software elements. In some embodiments, CPUs 32 (on which OSs 40 and agents 56 run), CPUs 72 (on which hypervisors 80, VMs 84 and agents 92 run), processor 52 and/or processor 104 comprise programmable processors, which are programmed in software to carry out the functions described herein. The software may be downloaded to one or more of the processors in electronic form, over a network, for example, or it may, alternatively or additionally, be provided and/or stored on non-transitory tangible media, such as magnetic, optical, or electronic memory.

Identification of Client-Server Relations for UDP Flows

The description that follows explains the operation of the monitoring agents (e.g., agents 56 or 92) and monitoring system (e.g., monitoring system 44 or 96) in inferring client-server relations between endpoints (e.g., computers 24 or VMs 84) of UDP flows. In the description below, the term "OS" refers to the OS of the relevant endpoint (e.g., OS 40 of computer 24, or guest OS 88 of VM 84).

The OS of an endpoint runs various software processes, e.g., processes relating to user applications and/or internal processes of the OS. Some of the processes may communicate with one another, e.g., exchange flows of packets using UDP. In order to initialize a UDP flow, the relevant process in the endpoint's OS typically issues a system call that creates a UDP network socket. Once a socket is created, the process may issue subsequent OS system calls for transmitting and/or receiving packets.

In some embodiments, the monitoring agents in the endpoints have access to the OSs of their respective endpoints. For example, the agents may be implemented as processes that run in the OS. Each agent is configured to monitor certain OS system calls and report at least some of the monitored system calls to the monitoring system.

In some embodiments, each agent monitors and reports two types of system calls in the OS of its endpoint—(i) "socket creation"—creation of a new UDP network socket, and (ii) "first usage"—the first usage of a newly-created UDP network socket. When reporting a socket creation or a first usage of a socket, the agent typically reports parameters such as the local endpoint address, the process that created the socket, the local port associated with the socket, the remote endpoint address, and the remote port. When reporting a first usage of a socket, the agent also reports whether the first usage was a read transaction or a write transaction.

In some embodiments, the monitoring system identifies the endpoints of each flow by correlating reports from different agents. For example, the monitoring system may find a match between flow 4-tuples (local IP address & port number, and remote IP address & port number) reported by two endpoints. Based on this match the monitoring system may decide that the two endpoints are associated with the same UDP flow.

For a given UDP flow between a pair of endpoints, the monitoring system uses the type of first usage (read or write) to decide whether the endpoint acts as a client or as a server in the flow. An endpoint in which the first usage of the socket was a write transaction (e.g., "send") is identified as a client. An endpoint in which the first usage of the socket was a read transaction (e.g., "receive") is identified as a server.

Figure 3:
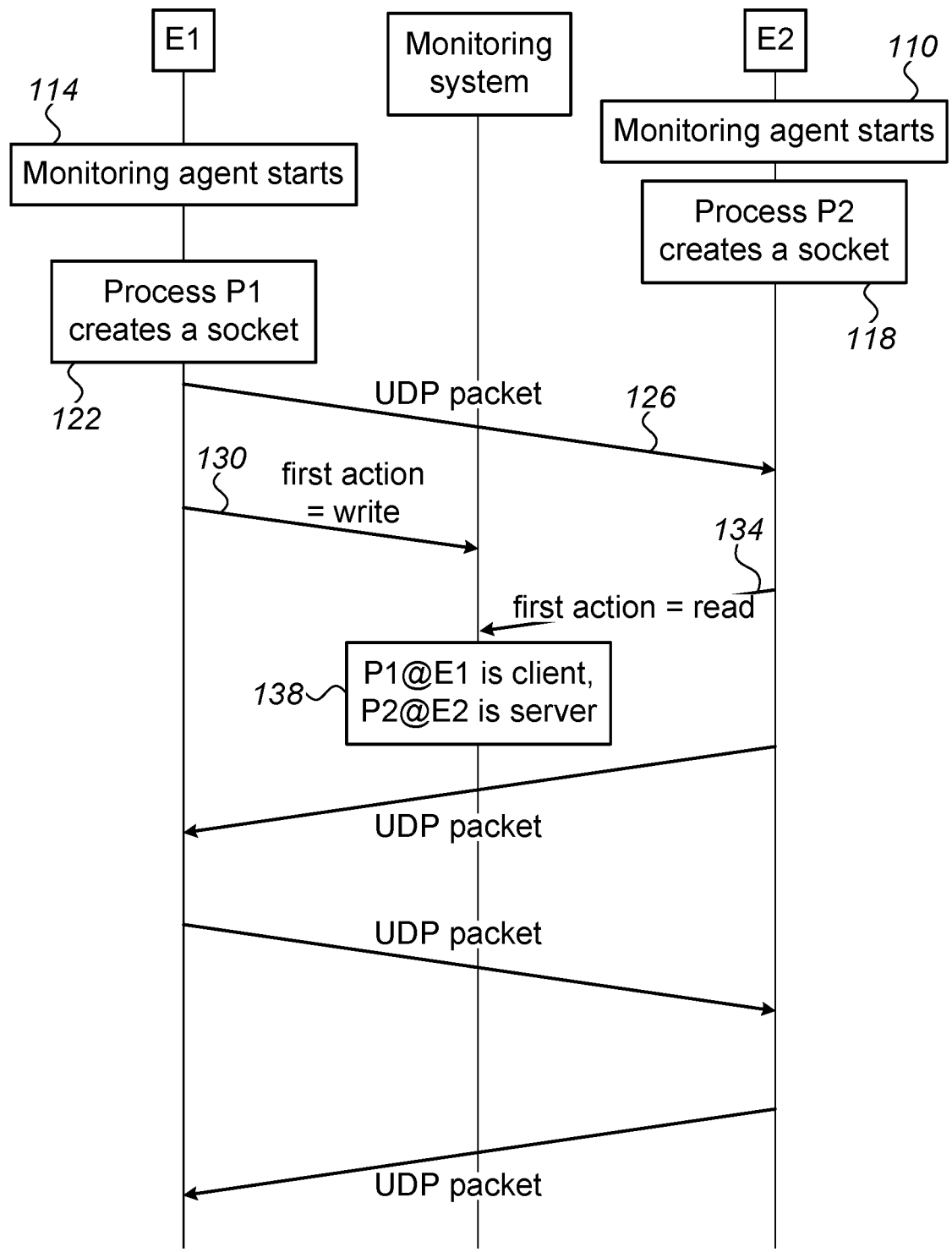
FIGS. 3-5 are message-flow diagrams that schematically illustrate methods for identifying client-server relations between endpoints, in accordance with embodiments of the present invention.
Figure 4:
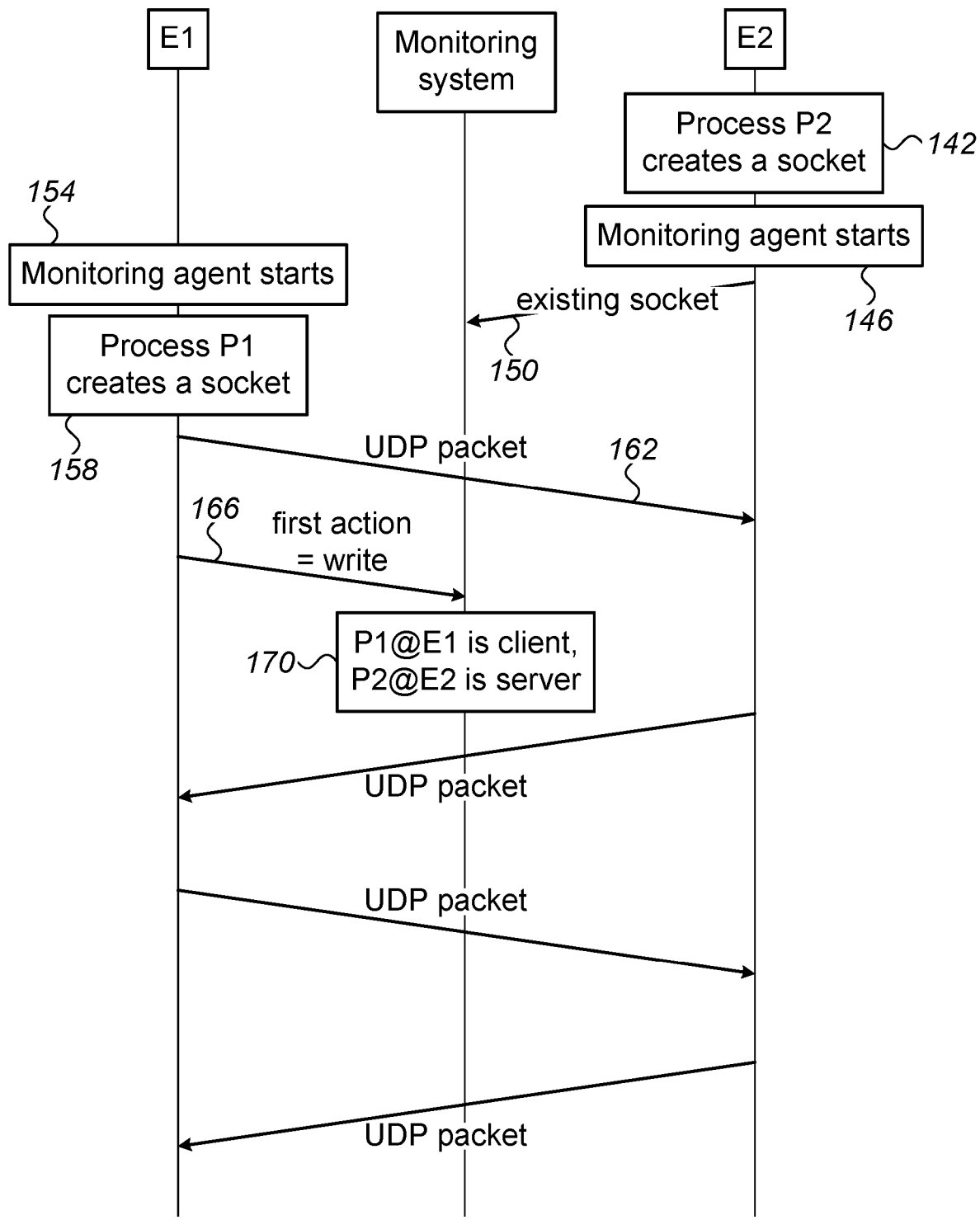
Figure 5:
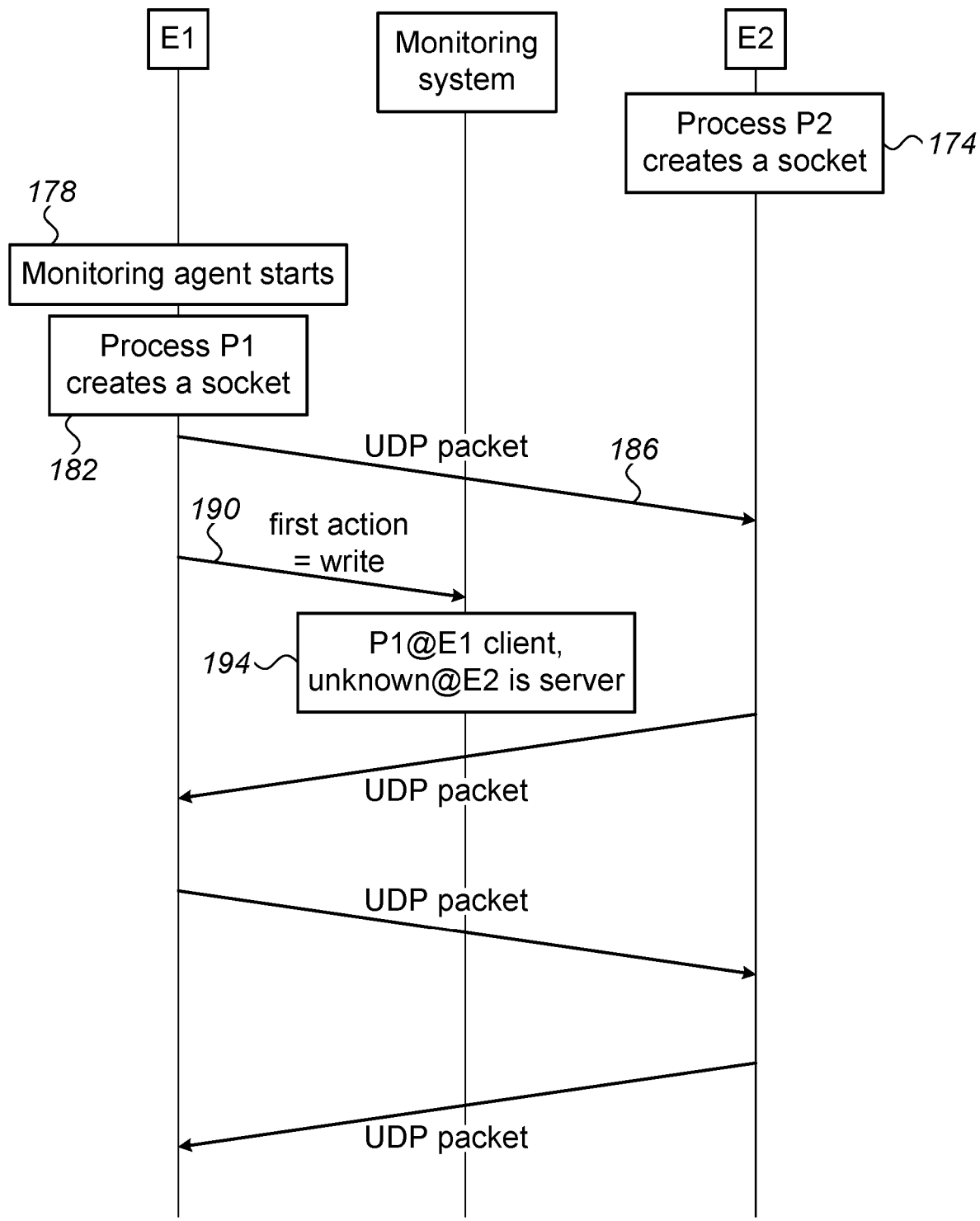

FIGS. 3-5 are message-flow diagrams that schematically illustrate methods for identifying client-server relations between endpoints based on the above-described criterion, in accordance with embodiments of the present invention. The diagrams refer to the exchange of messages between two endpoints denoted E1 and E2 (identified as endpoints of a UDP flow), as well as the exchange of messages between the monitoring agents in these endpoints (possibly in only one of the endpoints) and the monitoring system. In all three diagrams the time axis advances from top to bottom.

Reference is now made to FIG. 3. The example of FIG. 3 begins with the monitoring agent in endpoint E2 beginning operation, at an E2 agent starting step 110. Subsequently, at an E1 agent starting step 114, the monitoring agent in endpoint E1 begins operation. At an E2 socket creation step 118, a process denoted P2 in endpoint E2 creates a socket for a new UDP flow exchanged with E1. At an E1 socket creation step 122, a process denoted P1 in endpoint E1 creates a socket for the new UDP flow exchanged with E2.

At a first packet transmission step 126, endpoint E1 sends a UDP packet to endpoint E2. This packet is the first usage of the new sockets in both E1 and E2.

From the perspective of E1, the first usage of the new socket is a write transaction. Therefore, the monitoring agent in E1 reports to the monitoring system a write-type first usage, at an E1 reporting step 130. As part of the report, the monitoring agent reports the identity of the process (P1) that created the socket in E1.

From the perspective of E2, the first usage of the new socket is a read transaction. Therefore, the monitoring agent in E2 reports to the monitoring system a read-type first usage, at an E2 reporting step 134. As part of the report, the monitoring agent reports the identity of the process (P2) that created the socket in E2.

The monitoring system infers the client-server relation for this flow, based on the reports from E1 and E2, at an inferring step 138. In the present example, the monitoring system concludes that endpoint E1 (and specifically process P1) acts as a client, and endpoint E2 (and specifically process P2) acts as a server. Subsequent UDP packets of this flow are shown subsequently.

In the example of FIG. 3, the monitoring agents in both endpoints began operating before the respective sockets were created. As such, the monitoring agents in both endpoints are able to detect the first usage of the socket, and decide whether the first usage is a write or a read. FIGS. 4 and 5 below demonstrate scenarios in which such complete information is not available.

Reference is now made to FIG. 4. In this example, in E2 the monitoring agent begins operating after the socket was created: Process P2 in E2 creates a socket, at an E2 socket creation step 142. The monitoring agent in E2 beginning operation only later, at an E2 agent starting step 146. In such a case, the monitoring agent in E2 has no way of telling whether the first usage of the socket is a read transaction or a write transaction. Thus, the monitoring agent of E2 merely reports that the socket exists, at an existing socket reporting step 150.

In E1, on the other hand, the monitoring agent starts operation (at an E1 agent starting step 154) before process P1 created the socket (at an E1 socket creation step 158).

At a first packet transmission step 162, endpoint E1 sends a UDP packet to endpoint E2. This packet is the first usage of the new sockets in both E1 and E2. As explained above, the monitoring agent in E2 has no way of telling that this is indeed the first usage.

In E1, the monitoring agent reports to the monitoring system a write-type first usage, at an E1 reporting step 166 (similarly to step 130 in FIG. 3). As part of the report, the monitoring agent of E1 reports the identity of the process (P1) that created the socket in E1.

The monitoring system infers the client-server relation for this flow, at an inferring step 170. In this example, the report from E1 (step 166) is sufficient for deciding that endpoint E1 (and specifically process P1) acts as a client. By correlating the first-usage report from E1 (step 166) with the existing-socket report from E2 (step 150), the monitoring system is able to decide that E2 (and specifically process P2) is the other endpoint of this UDP flow. Since E1 was identified as the client, the monitoring system infers that E2 (and specifically process P2) acts as a server.

Reference is now made to FIG. 5. The example of FIG. 5 begins with process P2 in endpoint E2 creating a socket, at an E2 socket creation step 174. In this example, however, endpoint E2 has no monitoring agent, and therefore no reports arrive from this endpoint.

In endpoint E1, on the other hand, the order of events is the same as in FIGS. 3 and 4: The monitoring agent starts operation (at an E1 agent starting step 178), and only later process P1 creates the socket (at an E1 socket creation step 182). Therefore, the monitoring agent in E1 is able to detect that a UDP packet 186 is the first usage of the socket. The monitoring agent of E1 thus reports to the monitoring system a write-type first usage, at an E1 reporting step 190. As part of the report, the monitoring agent of E1 reports the identity of the process (P1) that created the socket in E1.

The monitoring system infers the client-server relation for this flow, at an inferring step 194. As explained above, the report from E1 (step 190) is sufficient for deciding that endpoint E1 (and specifically process P1) acts as a client, and that E2 acts as a server. (The identity of E2 can be found, for example, from the remote address reported by E1.) In the example of FIG. 5, however, the monitoring system cannot identify the process in E2 that handles this UDP flow.

The methods and message exchanges shown in FIGS. 3-5 are depicted purely by way of example. In alternative embodiments and other suitable method or message exchange can be used.

Handling Incomplete Monitoring Scenarios

In some practical scenarios, the monitoring system does not have reliable first-usage indication for any of the endpoints of a UDP flow. Such a scenario may occur, for example, when an endpoint is not fitted with an agent at all, or when an agent fitted in an endpoint begins monitoring only after the socket has been created. In some embodiments, the monitoring system may use various heuristics for deducing which endpoint acts as the server and which endpoint acts as the client. The deduction in such cases is not guaranteed and is regarded as having some upper-bounded confidence level. Multiple different heuristics may be combined to increase the level of confidence.

For example, if a socket was first used for sending (as is typical of a client), then there is a high likelihood that memory sections relating to transmission (e.g., buffers or other data structures) will be allocated in memory before allocating memory sections relating to reception. Assuming memory is allocated from some common pool, e.g., heap, the memory sections relating to transmission will have addresses that are closer to the base (start) address of the pool than the memory sections relating to reception. By the same token, if a socket was first used for receiving (as in a server), then there is a high likelihood that the memory sections relating to reception will have addresses that are closer to the base (start) address of the pool than the memory sections relating to transmission.

Thus, in an embodiment, if the monitoring system finds that memory addresses, which were allocated in an endpoint for send operations, are closer to a base address of the memory pool than the memory addresses allocated for receive operations, the monitoring system deduces that the endpoint acts as a client. If the memory addresses allocated for receive operations are closer to the base address than the memory addresses allocated for send operations, the monitoring system deduces that the endpoint acts as a server.

As another example, the monitoring system may deduce that an endpoint acts as a client if the port assigned to the UDP flow in the endpoint is likely to be an ephemeral port. The rationale behind this heuristic is that client processes are usually indifferent to the port they use, and typically obtain an ephemeral port from the OS. Server processes, on the other hand, typically use specific port for listening for client messages directed to these ports. Thus, by assessing whether the port assigned to a socket is an ephemeral port or not, the monitoring system may deduce whether the endpoint is likely to play the role of a client or a server.

The monitoring system may use various criteria for assessing whether a port is likely to be an ephemeral port or not. For example, a port assigned from a consecutive list of ports, or a port assigned from a range of port numbers known to be dedicated to ephemeral ports, is likely to be an ephemeral port. A port number that is requested specifically by the user, or by the creating process, is likely not to be an ephemeral port. This technique may perform better (with higher likelihood of success) close to system restart, while only a small number of sockets have been created and/or closed. In practice, this condition is met by most of the cases in which the monitoring system is likely to miss creation of a socket.

Another example heuristic uses the fact that server processes tend to reuse ports in multiple connections. Therefore, by correlating information from different connections (e.g., UDP flows) the monitoring system is able to identify port numbers that recur in multiple connections with the same process (and deduce that the endpoint acts as a server in these flows). A port number that does not recur across flows may indicate that the endpoint acts as a client.

As yet another example, the monitoring system (e.g., using the monitoring agents) may inspect the configuration of an endpoint, e.g., by inspecting configuration files and/or registry values. Such configurations often pre-specify ports assigned to servers. In a given endpoint, if the monitoring system identifies that the local (remote) port used by a UDP flow is identical to a port specified as a server port in a configuration file of the endpoint, the monitoring system may deduce that the endpoint acts as a server (client) in this flow.

In another embodiment, the monitoring system may distinguish between a server and a client by analyzing the temporal pattern of OS system calls in an endpoint. Typically, the temporal pattern of request/response transactions differs between servers and clients. For example, the time interval between a client request and the corresponding server response is typically shorter than the time interval between a server response and the next client request. These differences can be used to deduce which endpoint acts as a server and which acts as a client.

The heuristics above are given purely by way of example. In alternative embodiments, the monitoring system may use any other suitable heuristic or criterion.

Handling Reverse Server-to-Client Connections

In some cases, after an initial connection between a client and server is formed, a client may use this initial connection to request the server to connect to the client over a new UDP flow. The new flow is a specific scenario in which a flow is initiated by a server. As such, this new flow, which is initiated by the server, might be misinterpreted in terms of client-server classification even if it is monitored correctly in the two endpoints.

In some embodiments, the monitoring system avoid this possible misinterpretation by considering together all flows or connections (whether TCP or UDP) between two processes. For a group of flows/connections between a pair of processes, the monitoring system uses only the earliest created flow for deducing which endpoint acts as the server and which acts as the client. The monitoring system then uses the result for all other flows in the group, typically regardless of port numbers.

Example State Machine

Figure 6:
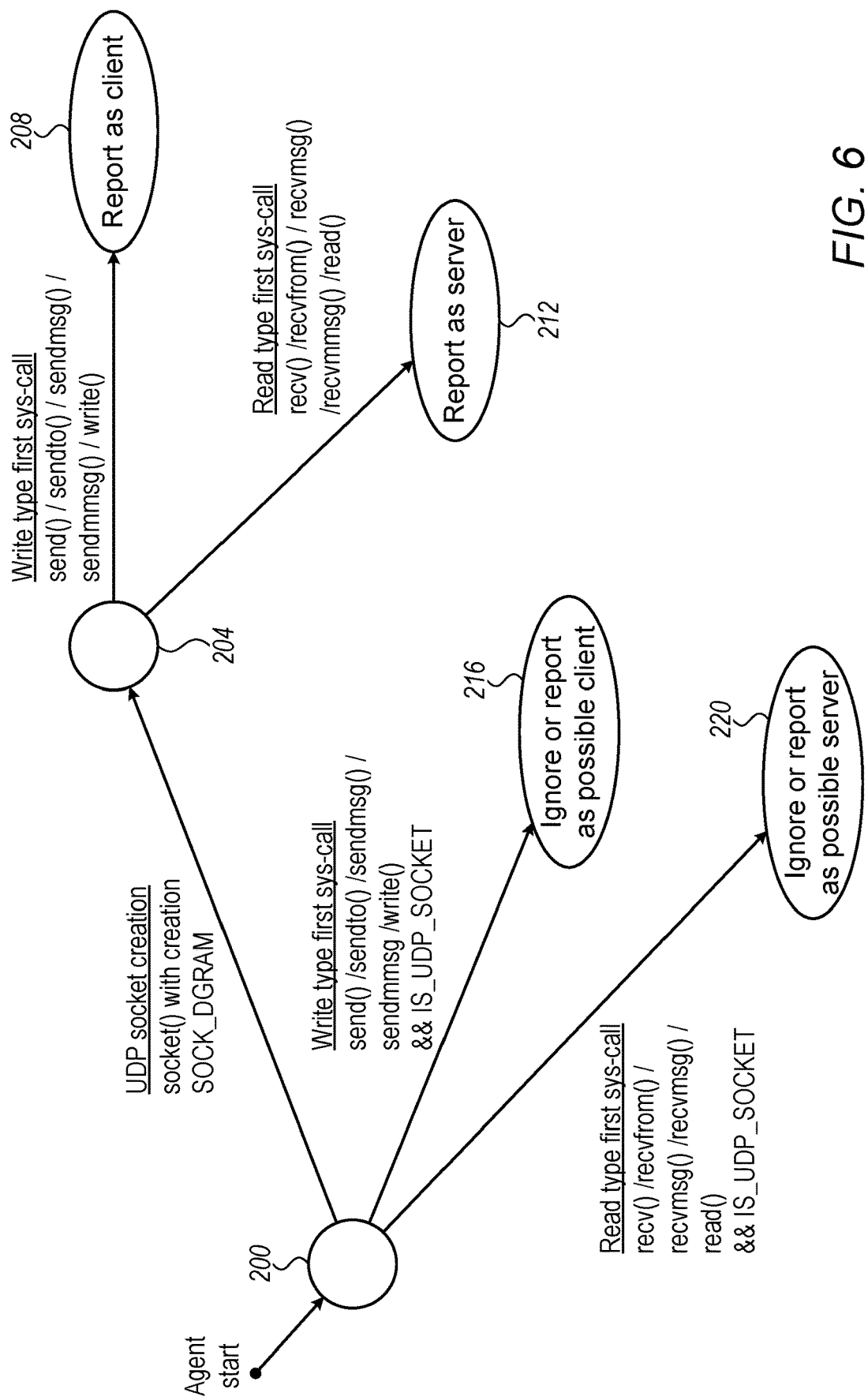
FIG. 6 is a state diagram that schematically illustrates a method for identifying client-server relations between endpoints, in accordance with an embodiment of the present invention.

FIG. 6 is a state diagram that schematically illustrates a method for identifying client-server relations between endpoints, in accordance with an embodiment of the present invention. Such a state machine may be used by a monitoring agent, and/or by the monitoring system as a whole, for estimating whether an endpoint of a UDP flow acts as a client or as a server.

After the monitoring agent starts monitoring, the state machine enters an initial state 200. From this state, three possible events (transition conditions) are defined:

Detection of creation of a UDP socket.
Detection that the first OS call is a write-type call.
Detection that the first OS call is a write-type call.

In the first case (detection of creation of a new UDP endpoint) the state machine transitions to a state 204. From this stage, if the first OS call detected ("first usage") is a write-type call, the state machine transitions to a state 208, in which the endpoint is reported as a client. If the first OS call detected is a read-type call, the state machine transitions to a state 212, in which the endpoint is reported as a server.

In the second case (detection that the first OS call is a write-type call, but without detecting an earlier socket creation), the state machine transitions to a state 216. In this state, the endpoint may be reported as a possible (but not certain) client. Alternatively, the system may decide not to decide.

In the third case (detection that the first OS call is a read-type call, but without a preceding socket creation), the state machine transitions to a state 220. In this state, the endpoint may be reported as a possible (but not certain) server, or the system may again decide not to decide.

The state machine above uses one possible heuristic, in the cases in which socket creation has been missed. In other embodiments, other heuristics can also be used. For example, in some cases the system may report detection of possible clients (state 216) and ignore detection of possible servers (state 220). This heuristic may be suitable, for example, if the system has prior information that agents are installed on the vast majority of servers.

Although the embodiments described herein mainly address inferring directions of flows in connection-less transport layer flows, the methods and systems described herein can also be used in other applications, such as in efficient distributed monitoring of flows in high rate networks and in inferring directions of flows of different transport protocols (e.g., TCP and UDP) that are tunneled through encrypted channels (e.g., VPNs).

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for monitoring a computing system comprising multiple endpoints, the method comprising:
   monitoring, in at least some of the endpoints, operating-system (OS) system calls relating to a transport protocol having no handshake mechanism;
   identifying, from among the multiple endpoints, first and second endpoints that exchange a flow of packets with one another using the transport protocol; and
   deducing, from the monitored system calls, which of the first and second endpoints acts as a server in the flow of packets, and which of the first and second endpoints acts as a client in the flow of packets, by:
      identifying (i) creation of a network socket for the flow of packets in the first endpoint, and (ii) an initial communication transaction occurring in the first endpoint after the creation of the network socket;
      if the initial communication transaction is a write transaction, deducing that the first endpoint acts as a client; and
      if the initial communication transaction is a read transaction, deducing that the first endpoint acts as a server.

2. The method according to claim 1, wherein the transport protocol comprises a User Datagram Protocol (UDP).

3. The method according to claim 1, further comprising identifying, based on the monitored system calls, at least one process in at least one of the first and second endpoints that is associated with the flow of packets.

4. The method according to claim 1, wherein monitoring the OS system calls comprises monitoring in the first and second endpoints (i) system calls that create network sockets and (ii) system calls that perform initial communication transactions occurring after the creation of the respective network sockets.

5. The method according to claim 1, wherein identifying the first and second endpoints comprises identifying a matching flow tuple in the first and second endpoints.

6. A method for monitoring a computing system comprising multiple endpoints, the method comprising:
   monitoring, in at least some of the endpoints, operating-system (OS) system calls relating to a transport protocol having no handshake mechanism;
   identifying, from among the multiple endpoints, first and second endpoints that exchange a flow of packets with one another using the transport protocol; and
   deducing, from the monitored system calls, which of the first and second endpoints acts as a server in the flow of packets, and which of the first and second endpoints acts as a client in the flow of packets, by:
      if memory addresses, which were allocated from a memory pool in the first endpoint for send operations, are closer to a base address of the memory pool than the memory addresses allocated for receive operations, deducing that the first endpoint acts as a client; and
      if the memory addresses, which were allocated for the receive operations, are closer to the base address than the memory addresses allocated for the send operations, deducing that the first endpoint acts as a server.

7. A method for monitoring a computing system comprising multiple endpoints, the method comprising:
   monitoring, in at least some of the endpoints, operating-system (OS) system calls relating to a transport protocol having no handshake mechanism;
   identifying, from among the multiple endpoints, first and second endpoints that exchange a flow of packets with one another using the transport protocol; and
   deducing, from the monitored system calls, that the first endpoint acts as a server in response to assessing that a port assigned to the flow of packets in the first endpoint is also assigned in one or more additional flows of packets.

8. A method for monitoring a computing system comprising multiple endpoints, the method comprising:
   monitoring, in at least some of the endpoints, operating-system (OS) system calls relating to a transport protocol having no handshake mechanism;
   identifying, from among the multiple endpoints, first and second endpoints that exchange a flow of packets with one another using the transport protocol; and
   deducing, from the monitored system calls, which of the first and second endpoints acts as a server in the flow of packets, and which of the first and second endpoints acts as a client in the flow of packets, by analyzing a temporal pattern of the OS system calls.

9. An apparatus for monitoring a computing system comprising multiple endpoints, the apparatus comprising:
   an interface, configured to receive, from at least some of the endpoints, monitored operating-system (OS) system calls relating to a transport protocol having no handshake mechanism; and
   a processor, configured to identify, from among the multiple endpoints, first and second endpoints that exchange a flow of packets with one another using the transport protocol, and to deduce, from the monitored system calls, which of the first and second endpoints acts as a server in the flow of packets, and which of the first and second endpoints acts as a client in the flow of packets, by:
      identifying (i) creation of a network socket for the flow of packets in the first endpoint, and (ii) an initial communication transaction occurring in the first endpoint after the creation of the network socket;
      if the initial communication transaction is a write transaction, deducing that the first endpoint acts as a client; and
      if the initial communication transaction is a read transaction, deducing that the first endpoint acts as a server.

10. The apparatus according to claim 9, wherein the transport protocol comprises a User Datagram Protocol (UDP).

11. The apparatus according to claim 9, wherein the processor is further configured to identify, based on the monitored system calls, at least one process in at least one of the first and second endpoints that is associated with the flow of packets.

12. The apparatus according to claim 9, wherein the processor is configured to monitor in the first and second endpoints (i) system calls that create network sockets and (ii) system calls that perform initial communication transactions occurring after the creation of the respective network sockets.

13. The apparatus according to claim 9, wherein the processor is configured to identify the first and second endpoints by identifying a matching flow tuple in the first and second endpoints.

14. An apparatus for monitoring a computing system comprising multiple endpoints, the apparatus comprising:
an interface, configured to receive, from at least some of the endpoints, monitored operating-system (OS) system calls relating to a transport protocol having no handshake mechanism; and
a processor, configured to identify, from among the multiple endpoints, first and second endpoints that exchange a flow of packets with one another using the transport protocol, and to deduce, from the monitored system calls, which of the first and second endpoints acts as a server in the flow of packets, and which of the first and second endpoints acts as a client in the flow of packets, by:
if memory addresses, which were allocated from a memory pool in the first endpoint for send operations, are closer to a base address of the memory pool than the memory addresses allocated for receive operations, deducing that the first endpoint acts as a client; and
if the memory addresses, which were allocated for the receive operations, are closer to the base address than the memory addresses allocated for the send operations, deducing that the first endpoint acts as a server.

15. An apparatus for monitoring a computing system comprising multiple endpoints, the apparatus comprising:
an interface, configured to receive, from at least some of the endpoints, monitored operating-system (OS) system calls relating to a transport protocol having no handshake mechanism; and
a processor, configured to identify, from among the multiple endpoints, first and second endpoints that exchange a flow of packets with one another using the transport protocol, and to deduce, from the monitored system calls, that the first endpoint acts as a server in response to assessing that a port assigned to the flow of packets in the first endpoint is also assigned in one or more additional flows of packets.

16. An apparatus for monitoring a computing system comprising multiple endpoints, the apparatus comprising:
an interface, configured to receive, from at least some of the endpoints, monitored operating-system (OS) system calls relating to a transport protocol having no handshake mechanism; and
a processor, configured to identify, from among the multiple endpoints, first and second endpoints that exchange a flow of packets with one another using the transport protocol, and to deduce, from the monitored system calls, which of the first and second endpoints acts as a server in the flow of packets, and which of the first and second endpoints acts as a client in the flow of packets, by analyzing a temporal pattern of the OS system calls.

* * * * *